US012594774B2

(12) United States Patent
Kido et al.

(10) Patent No.: US 12,594,774 B2
(45) Date of Patent: Apr. 7, 2026

(54) HEATING DEVICE, IMAGE FORMING APPARATUS, AND LIQUID DISCHARGE APPARATUS HAVING HEATING ROLLER WITH MULTIPLE FIXED HEATING SOURCES

(71) Applicants: Takuto Kido, Kanagawa (JP); Toshiya Satoh, Kanagawa (JP); Yuichi Tanioku, Kanagawa (JP); Akihiro Shima, Kanagawa (JP); Teiichiro Ishikawa, Tokyo (JP); Yusuke Morikawa, Kanagawa (JP)

(72) Inventors: Takuto Kido, Kanagawa (JP); Toshiya Satoh, Kanagawa (JP); Yuichi Tanioku, Kanagawa (JP); Akihiro Shima, Kanagawa (JP); Teiichiro Ishikawa, Tokyo (JP); Yusuke Morikawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 231 days.

(21) Appl. No.: 18/521,698

(22) Filed: Nov. 28, 2023

(65) Prior Publication Data

US 2024/0174003 A1 May 30, 2024

(30) Foreign Application Priority Data

Nov. 30, 2022 (JP) ................................ 2022-191818
Aug. 3, 2023 (JP) ................................ 2023-127208

(51) Int. Cl.
*B41J 11/00* (2006.01)

(52) U.S. Cl.
CPC .... *B41J 11/00244* (2021.01); *B41J 11/00242* (2021.01)

(58) Field of Classification Search
CPC ............ B41J 11/00244; B41J 11/00242; B41J 11/0025; H05B 1/0241; H05B 3/0095; G03G 15/2042; G03G 15/2053
See application file for complete search history.

(56) References Cited

U.S. PATENT DOCUMENTS 6,272,308 B1 * 8/2001 Maeda .............. G03G 15/2053 399/328
2013/0108300 A1 5/2013 Fujii
(Continued)

FOREIGN PATENT DOCUMENTS

EP 1 055 978 B1 4/2005
JP 2003151722 A * 5/2003
(Continued)

OTHER PUBLICATIONS

Extended European Search Report issued Apr. 23, 2024 in European Patent Application No. 23213218.3, 10 pages.

*Primary Examiner* — Bradley W Thies
(74) *Attorney, Agent, or Firm* — XSENSUS LLP

(57) ABSTRACT

A heating device, an image forming apparatus, and a liquid discharge apparatus. The heating device includes a heating roller having heat sources inside to heat a sheet. The heat sources include three or more first heat sources having a same distribution of thermal intensity and a second heat source having a distribution of thermal intensity different from the distribution of the thermal intensity of the first heat sources, and the second heat source is disposed inside a polygon whose vertices are the first heat sources when viewed from one end of the heating roller in a longitudinal direction of the heating roller. The image forming apparatus includes an image forming device to form an image on a sheet, and the heating device to heat the sheet. The liquid discharge apparatus includes a liquid discharge device to
(Continued)

discharge liquid onto a sheet, and the heating device to heat the sheet.

16 Claims, 9 Drawing Sheets

(56) References Cited

U.S. PATENT DOCUMENTS

| | | | | |
|---|---|---|---|---|
| 2019/0337307 | A1 | 11/2019 | Onodera et al. | |
| 2019/0344589 | A1 | 11/2019 | Onodera et al. | |
| 2020/0001622 | A1 | 1/2020 | Kitaoka et al. | |
| 2020/0164663 | A1 | 5/2020 | Nishimura et al. | |
| 2020/0233348 | A1 | 7/2020 | Nakajima et al. | |
| 2020/0307259 | A1 | 10/2020 | Yorimoto et al. | |
| 2021/0072680 | A1 | 3/2021 | Yoshida et al. | |
| 2021/0245530 | A1* | 8/2021 | Tanemoto ............... | F26B 13/08 |

FOREIGN PATENT DOCUMENTS

| | | | |
|---|---|---|---|
| JP | 2010-177027 | A | 8/2010 |
| JP | 2016-069095 | A | 5/2016 |
| JP | 2017-007254 | A | 1/2017 |

* cited by examiner

HEATING DEVICE, IMAGE FORMING APPARATUS, AND LIQUID DISCHARGE APPARATUS HAVING HEATING ROLLER WITH MULTIPLE FIXED HEATING SOURCES

CROSS-REFERENCE TO RELATED APPLICATIONS

This patent application is based on and claims priority pursuant to 35 U.S.C. § 119(a) to Japanese Patent Application Nos. 2022-191818 and 2023-127208, filed on Nov. 30, 2022, and Aug. 3, 2023, respectively, in the Japan Patent Office, the entire disclosures of which are hereby incorporated by reference herein.

BACKGROUND

Technical Field

Embodiments of the present disclosure relate to a heating device, an image forming apparatus, and a liquid discharge apparatus.

Background Art

As heating devices provided for apparatuses such as image forming apparatuses, for example, drying devices that heat and dry a sheet onto which liquid such as ink is applied are known in the art.

For example, drying devices that dry a sheet using a heating roller having a heat source inside have been proposed.

As methods of increasing the amount of the heat supplied from the heating roller to the sheet, the number of heater lamps arranged in each one of the multiple heating rollers may be increased, or the output power or the amount of heat generation of each heat source may be increased.

SUMMARY

Embodiments of the present disclosure described herein provide a heating device, an image forming apparatus, and a liquid discharge apparatus. The heating device includes a heating roller having heat sources inside to heat a sheet. The heat sources include three or more first heat sources having a same distribution of thermal intensity and a second heat source having a distribution of thermal intensity different from the distribution of the thermal intensity of the three or more first heat sources, and the second heat source is disposed inside a polygon whose vertices are the three or more first heat sources when viewed from one end of the heating roller in a longitudinal direction of the heating roller. The image forming apparatus includes an image forming device to form an image on a sheet, and the heating device to heat the sheet. The liquid discharge apparatus includes a liquid discharge device to discharge liquid onto a sheet, and the heating device to heat the sheet.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

Figure 1:
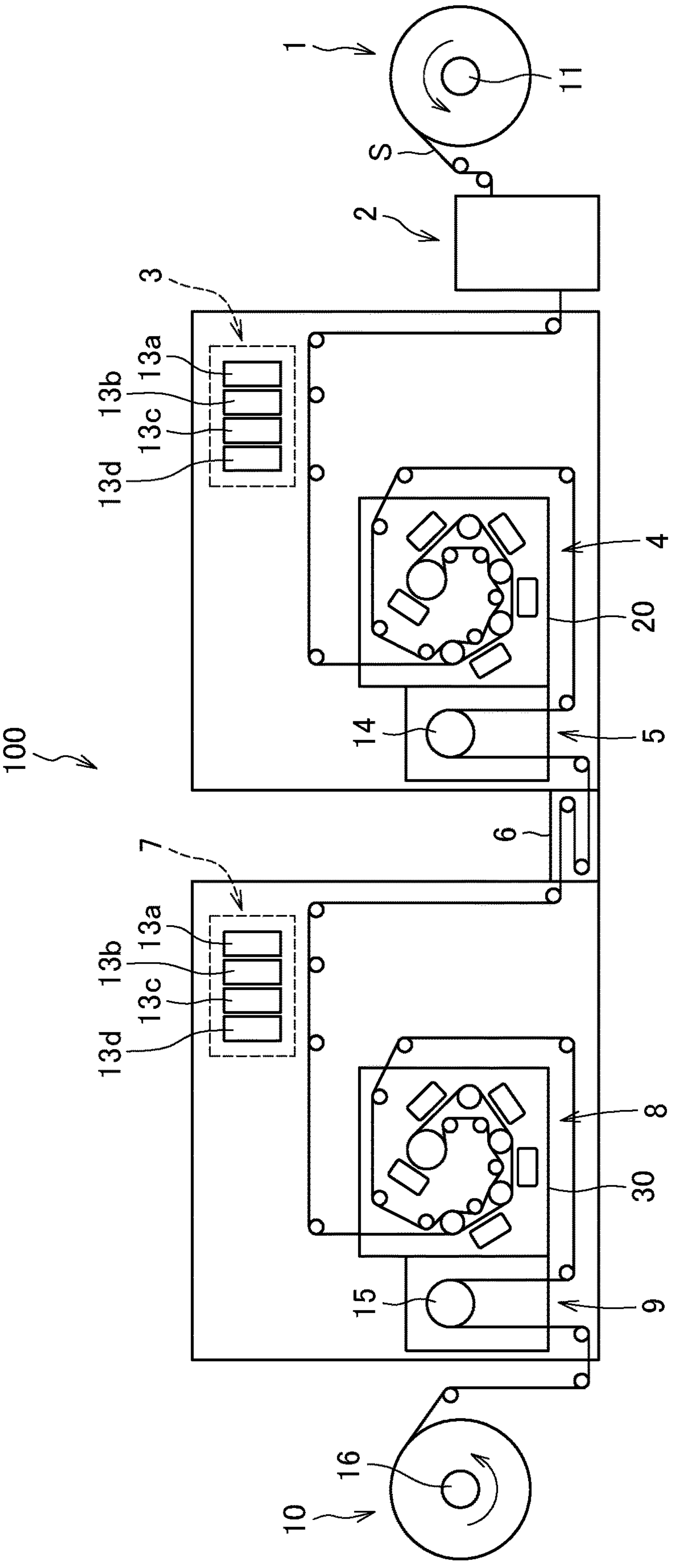
FIG. 1 is a schematic diagram of an inkjet image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

A drying device provided for an image forming apparatus 100 according to an embodiment of the present disclosure that adopts inkjet printing is described below with reference to the drawings. In the drawings and the description of the embodiments of the present disclosure, like reference signs denote elements such as members or components having similar shapes or similar functionality, and overlapping description may be omitted where appropriate.

Firstly, an overall configuration of the image forming apparatus 100 according to the present embodiment that adopts inkjet printing is described with reference to FIG. 1.

FIG. 1 is a schematic diagram of an inkjet image forming apparatus 100 according to an embodiment of the present disclosure.

The image forming apparatus 100 according to the present embodiment as illustrated in FIG. 1 that adopts inkjet printing includes a sheet feeding unit 1, a preprocessor 2, a first image forming device 3, a first drier unit 4, a first cooling unit 5, a reversing unit 6, a second image forming device 7, a second drier unit 8, a second cooling unit 9, and a sheet collecting unit 10.

The sheet feeding unit 1 according to the present embodiment is provided with a sheet feeding roller 11 around which a long sheet S is wound and formed into a roll form. The sheet S is fed as the sheet feeding roller 11 rotates in the direction of the arrows as indicated in FIG. 1. The fed sheet S is supplied to the preprocessor 2.

The preprocessor 2 according to the present embodiment is provided with, for example, a treatment liquid applicator that applies the treatment liquid to one side or both sides of the sheet S supplied from the sheet feeding unit 1. For example, the treatment liquid is liquid with a function to coagulate the ink, and is applied onto the sheet S on which an image is not yet formed to prevent bleeding or feathering of ink or to assist permeation. As a result, the image quality can be increased. The sheet S onto which the treatment liquid has been applied is supplied to the first image forming device 3.

The first image forming device 3 according to the present embodiment includes a plurality of liquid discharge heads 13*a*, 13*b*, 13*c*, and 13*d* that serve as liquid discharge devices to discharge liquid ink. In the present embodiment described with reference to FIG. 1, the liquid discharge head 13*a* used for black (K) ink, the liquid discharge head 13*b* used for cyan (C) ink, the liquid discharge head 13*c* used for magenta (M) ink, and the liquid discharge head 13*d* used for yellow (Y) ink are arranged in the order listed from an upstream portion to a downstream portion of the apparatus in the conveyance direction of the sheet S. The order in which the multiple liquid discharge heads 13*a*, 13*b*, 13*c*, and 13*d* are arranged is not limited to the order illustrated in FIG. 1, and the liquid discharge heads may be in any order. The ink according to the present embodiment is a liquid that contains a colorant, a solvent, and particles of crystalline polymer dissolved by the solvent, and the crystalline polymer undergoes a phase change and melts from a crystalline state into a liquid state when heated to a temperature equal to or higher than a certain melting point. Once the sheet S is supplied to the first image forming device 3, ink is discharged from each of the liquid discharge heads 13*a*, 13*b*, 13*c*, and 13*d* to the first face of the sheet S, and an image is formed on the first face of the sheet S.

The first drier unit 4 includes a first drying device 20 that heats the sheet S to dry the ink on the sheet S. When the sheet S is supplied from the first image forming device 3 to the first drier unit 4, the sheet S is heated by the first drying device 20 and the ink on the sheet S is dried.

The first cooling unit 5 includes a plurality of cooling rollers 14. When the sheet S is supplied from the first drier unit 4 to the first cooling unit 5, the sheet S is cooled as the sheet S contacts the multiple cooling rollers 14.

The reversing unit 6 is configured by a known device that reverses the front and rear sides of the sheet S. When the sheet S that is supplied from the first cooling unit 5 passes through the reversing unit 6, the front and rear sides of the sheet S are turned and the sheet S is sent to the second image forming device 7. For example, when the sheet S is supplied to the reversing unit 6 with the front side facing upward, the sheet S is reversed such that the front side faces downward and the rear side faces upward and is supplied to the second image forming device 7.

In a similar manner to the first image forming device 3 as above, the second image forming device 7 includes a plurality of liquid discharge heads 13*a*, 13*b*, 13*c*, and 13*d*. However, unlike the first image forming device 3, an image is formed on the rear side of the sheet S instead of the front side in the second image forming device 7. Such a rear side of the sheet S may be referred to as the second face in the following description. In other words, the front and rear sides of the sheet S are turned by the reversing unit 6 and the sheet S is supplied to the second image forming device 7. Accordingly, once the sheet S is supplied to the second image forming device 7, ink is discharged from each of the liquid discharge heads 13*a*, 13*b*, 13*c*, and 13*d* to the rear side of the sheet S, and an image is formed on the rear side of the sheet S.

The second drier unit 8 and the second cooling unit 9 are configured in a similar manner to the first drier unit 4 and the first cooling unit 5 as above. Accordingly, once the sheet S is supplied to the second drier unit 8 after an image is formed on the rear side of the sheet S in the second image forming device 7 as above, the sheet S is heated by the second drying device 30 of the second drier unit 8 and the ink on the sheet S is dried. Subsequently, the sheet S is cooled by the cooling roller 15 of the second cooling unit 9.

The sheet collection unit 10 is provided with a collection roller 16 that winds and collects the sheet S. As the collection roller 16 is driven to rotate in the direction indicated by the arrows in FIG. 1, the sheet S is wound in a roll form and collected.

Figure 2:
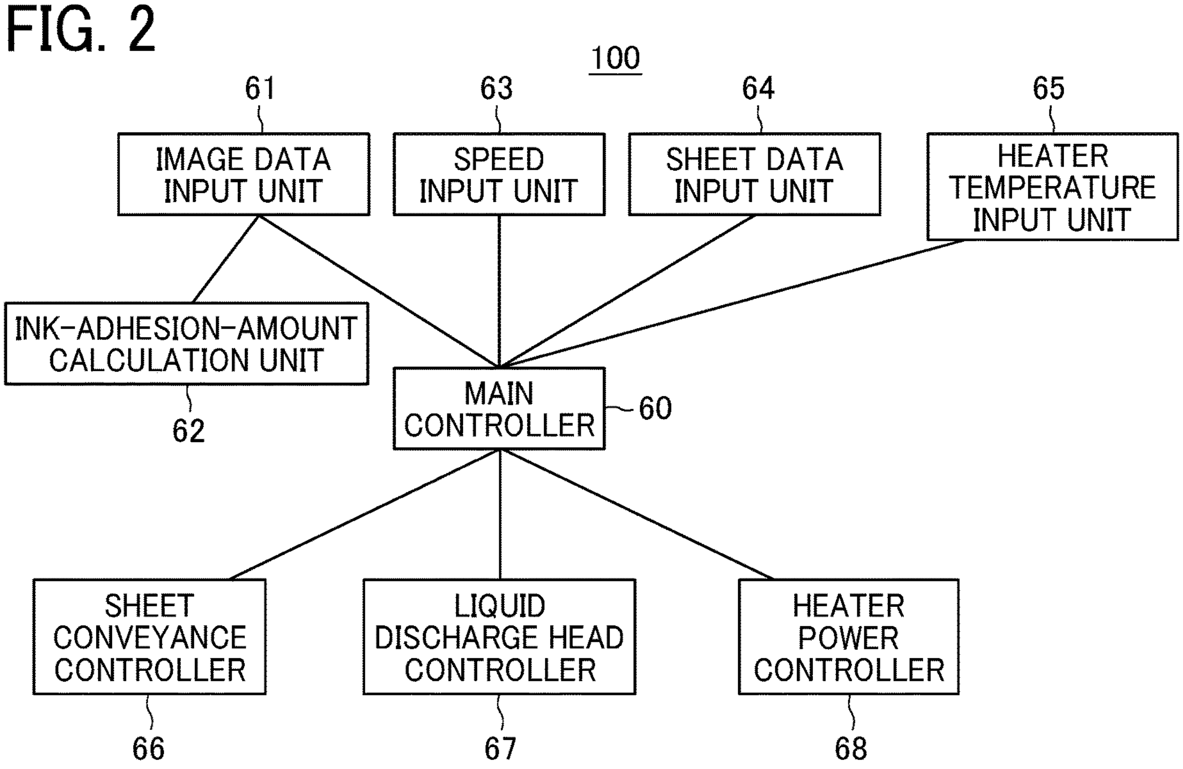
FIG. 2 is a block diagram illustrating the control blocks of an image forming apparatus according to an embodiment of the present disclosure.

FIG. 2 is a block diagram illustrating the control blocks of the image forming apparatus 100 according to the present embodiment.

As illustrated in FIG. 2, the image forming apparatus 100 according to the present embodiment includes an image data input unit 61, an ink-adhesion-amount calculation unit 62, a speed input unit 63, a sheet data input unit 64, a heater temperature input unit 65, a main controller 60, a sheet conveyance controller 66, a liquid discharge head controller 67, and a heater power controller 68.

To the image data input unit 61 according to the present embodiment, the data of the print image to be printed on the sheet S and the data of the maximum amount of ink to be adhered to the sheet S are input. The data of the maximum amount of the ink to be adhered to the sheet S, which is input to the image data input unit 61, may be the amount of the ink to be adhered to the sheet S, which is input by an operator, or the data of the maximum amount of the ink that the ink-adhesion-amount calculation unit 62 calculates based on the data of the print image input to the image data input unit 61.

To the speed input unit 63, the sheet conveying speed is input. The sheet conveyance speed that is input to the speed input unit 63 may be a speed input by an operator or the sheet conveyance speed detected by a speed sensor provided for the image forming apparatus 100.

To the sheet data input unit 64, the data of the sheet S that is used for printing is input. The data of the sheet S that is input to the sheet data input unit 64 is, for example, the weighing capacity or basis weight of the sheet S, the weight of the sheet S per each unit of dimension, or the width of the sheet S. The data of the sheet S to be input may be the data input by an operator, or the data of the sheet S detected by a sheet sensor provided for the image forming apparatus 100.

To the heater temperature input unit 65, the temperature information that is obtained by the heater lamps 25*a* and 25*b* provided for each one of the first drying device 20 and the second drying device 30 is input. The temperature information of the heater lamps 25*a* and 25*b* to be input to the heater temperature input unit 65 may be the temperature information input by an operator, or the temperature information of the heater lamps 25*a* and 25*b* detected by a temperature sensor provided for the image forming apparatus 100.

The main controller 60 according to the present embodiment is used to control the sheet conveyance controller 66, the liquid discharge head controller 67, and the heater power controller 68, based on the various kinds of information input to the image data input unit 61, the speed input unit 63, the sheet data input unit 64, and the heater temperature input unit 65.

The sheet conveyance controller 66 controls the conveyance speed of the sheet S to a desired conveyance speed based on the input data of the sheet conveyance speed. For example, the sheet conveyance controller 66 controls the rotation speeds of, for example, the sheet feeding roller 11, the collection roller 16, and other conveyance rollers illustrated in FIG. 1.

The liquid discharge head controller 67 according to the present embodiment controls the multiple liquid discharge heads 13*a*, 13*b*, 13*c*, and 13*d* as illustrated in FIG. 1, based on the input image data of the print image and the input data of the maximum amount of adhered ink. The liquid discharge head controller 67 controls the ink discharging operation of the multiple liquid discharge heads 13*a*, 13*b*, 13*c*, and 13*d* to form an image on the sheet S as desired.

The heater power controller 68 according to the present embodiment controls the power supplied to the heater lamps provided for the first drying device 20 or the second drying device 30, based on the input temperature information of the heater lamps. The heater power controller 68 controls the power supplied to the heater lamps such that the output or the amount of heat generated by the heater lamps is controlled.

Figure 3:
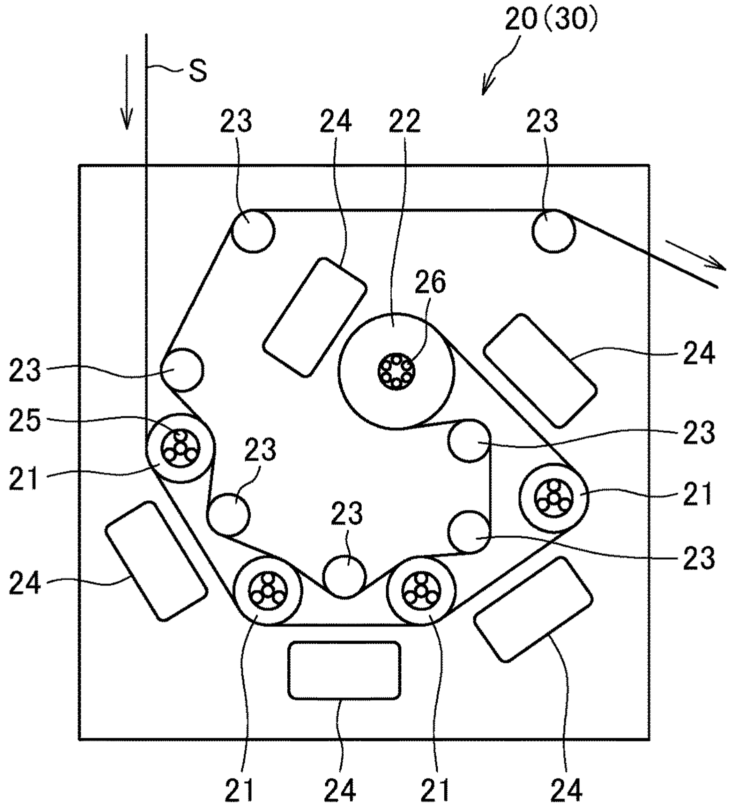
FIG. 3 is a schematic diagram of a drying device according to an embodiment of the present disclosure.

FIG. 3 is a schematic diagram of the first drying device 20 or the second drying device 30 according to the present embodiment.

A basic configuration of the first drying device 20 and the second drying device 30 that are provided for the first drier unit 4 and the second drier unit 8, respectively, is described with reference to FIG. 3. As the configuration or structure of the first drying device 20 is equivalent to the configuration or structure of the second drying device 30, only the configuration or structure of the first drying device 20 will be described, and the description of the configuration or structure of the second drying device 30 will be omitted.

As illustrated in FIG. 3, the first drying device 20 includes a plurality of heating rollers 21, one heating drum 22, a plurality of guide rollers 23, and a plurality of air blowing units 24.

The heating drum 22 according to the present embodiment is a large-diameter roller (cylindrical member) having therein a plurality of heater lamps 26 that serve as heat sources. Each one of the multiple heating rollers 21 according to the present embodiment is a roller (cylindrical member) having a diameter narrower than the diameter of the heating drum 22, and a plurality of heater lamps 25 that serve as a plurality of heat sources are arranged inside each one of the heating rollers 21 in a similar manner to the heating drum 22. Unlike the heating drum 22 and the multiple heating rollers 21, each one of the multiple guide rollers 23 according to the present embodiment does not have a heat source such as a heater lamp therein, and serves as a guide unit to guide the sheet S.

The multiple heating rollers 21 and the multiple guide rollers 23 are spirally arranged around the heating drum 22. The sheet S is looped over the multiple heating rollers 21 and the heating drum 22 in addition to the multiple guide rollers 23. Due to such configurations as described above, a guide path along which the sheet S is guided is arranged.

When the sheet S is conveyed into the first drying device 20, firstly, the sheet S is stretched over the outer sides of the multiple heating rollers 21. The outer sides of the multiple heating rollers 21 herein indicate the other sides of the center of the heating drum 22 on the assumption that the center of the heating drum 22 is defined as the inside. When the sheet S is stretched over the outer sides of the multiple heating rollers 21, the surface of the sheet S on which no image is to be formed contacts the heating rollers 21. In other words, the surface of the sheet S that contacts the heating rollers 21 is on the other side of the sheet S onto which ink is to adhere and an image is to be formed. Accordingly, the sheet S is heated from the surface of the sheet S on which no image is to be formed. The sheet S is conveyed while contacting the multiple heating rollers 21, and is then looped around the heating drum 22. Further, the sheet S is stretched from the heating drum 22 to the multiple guide rollers 23, and is conveyed while the surface of the sheet S on which no image is to be formed is contacting the inner sides of the multiple heating rollers 21. As described above, the sheet S is conveyed while contacting the outer sides of the multiple heating rollers 21, and then is looped around the heating drum 22. Further, as the sheet S is conveyed while contacting the inner sides of the multiple heating rollers 21, the sheet S is efficiently heated and drying of the ink on the sheet S is accelerated.

The multiple air blowing units 24 blow air on the sheet S at a plurality of places where the sheet S is stretched by the multiple heating rollers 21 and the multiple guide rollers 23 and at a position facing the heating drum 22. As a result, drying of the ink on the sheet S is further accelerated. Subsequently, the sheet S is conveyed outside the first drying device 20.

When a thick sheet is conveyed or when the conveyance speed of the sheet is increased in order to increase the productivity in the image forming apparatus 100 according to the present embodiment that adopts inkjet printing and is provided with the drying device, the amount of the heat supplied from the heating roller to the sheet needs to be increased. As a method of increasing the amount of heat supplied to the sheet, the number of heater lamps inside the heating roller may be increased, or the output power of the heater lamps may be increased. However, increasing the number of heater lamps may lead to an increase in the size and cost of the apparatus, and increasing the output of the heater lamps may cause the temperatures of, for example, the heater lamps or the heating roller to exceed the heat resistance. In other words, a method in which the number of heat sources is increased has a restriction on the size or cost of the apparatus, and a method in which the output power of the heat sources is increased has a restriction on the heat resistance of the components of the apparatus. For this reason, simple measures in which the number of heat sources is increased or the output power is increased cannot effectively increase the amount of heat supply without exceeding the range of heat resistance of components or elements.

In order to deal with such a situation, the arrangements of the heat sources in the present embodiment are changed as follows in order to increase the amount of heat supply of the heating rollers effectively without exceeding the range of heat resistance and without increasing the number of heat sources in the arrangement. One of the heater lamps 25 arranged inside one of the heating rollers 21 is described below with reference to FIG. 4, FIG. 5, FIG. 6, and FIG. 7 by way of example in order to describe a configuration or structure of the heater lamps 25 inside each one of the multiple heating rollers 21 provided for the first drying device 20 and the second drying device 30 described above.

Figure 4:
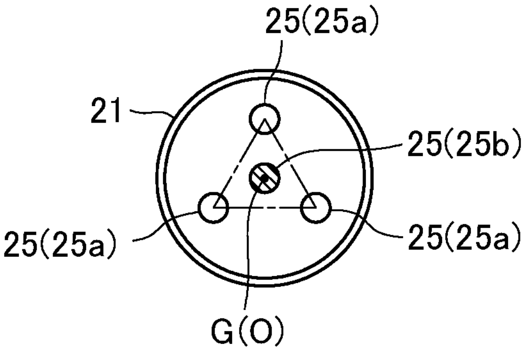
FIG. 4 is a side view of a heating roller as viewed from one end of the heating roller in the longitudinal direction, according to an embodiment of the present disclosure.

FIG. 4 is a side view of one of the heating rollers 21 as viewed from one end of the heating roller 21 in the longitudinal direction parallel to the rotation axis direction, according to the present embodiment.

In the present embodiment described with reference to FIG. 4, four heater lamps 25 are arranged inside each one of the heating rollers 21. Three heater lamps 25*a* of the four heater lamps 25 are arranged at the vertices of a regular triangle, and the remaining one heater lamp 25*b* is arranged inside the regular triangle whose vertices are the three heater lamps 25*a*. In particular, in the present embodiment, the one heater lamp 25*b* that is arranged inside the regular triangle is arranged at the center of gravity G of the regular triangle and at the rotation center O of the heating roller 21. In the present embodiment, the heating rollers 21 are driven to rotate as the sheet S is conveyed, but the multiple heater lamps 25*a* and the heater lamp 25*b* of each heating roller are fixed so as not to rotate even when the heating rollers 21 rotate. Due to such a configuration, the arrangement of the multiple heater lamps 25*a* and the heater lamp 25*b* of each heating roller is maintained.

Figure 5:
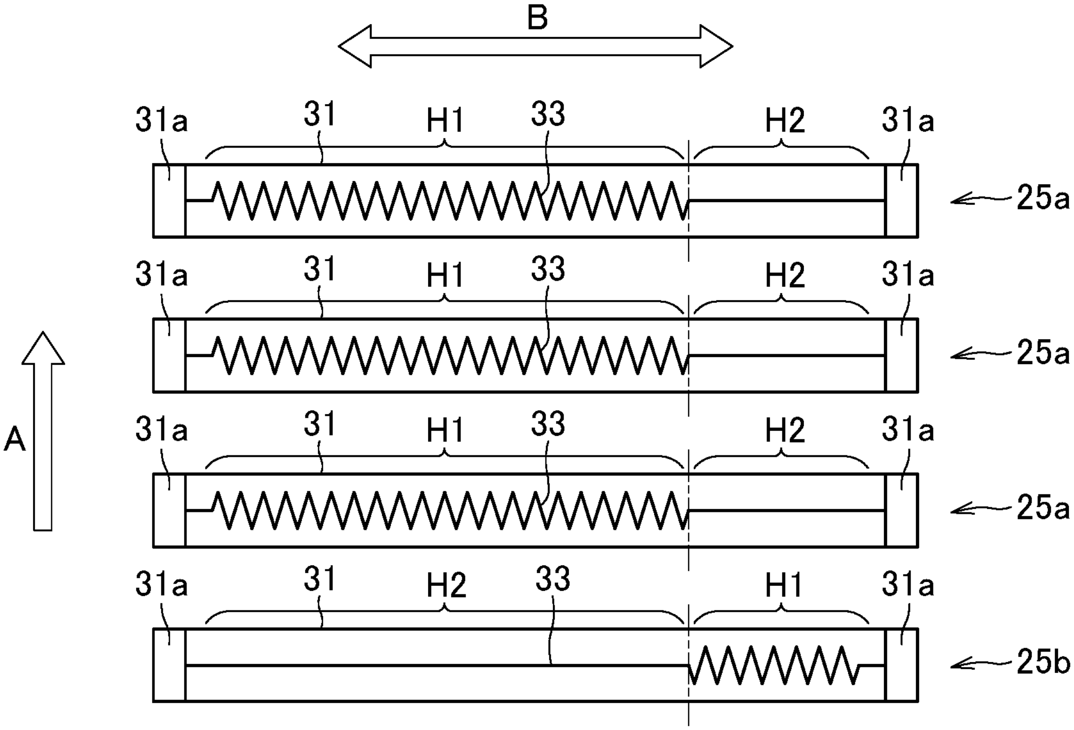
FIG. 5 is a schematic diagram of four heater lamps in a heating roller arranged in the conveyance direction of a sheet, according to an embodiment of the present disclosure.

FIG. 5 is a schematic diagram of four heater lamps including the pair of heater lamps 25*a* and the pair of heater lamps 25*b* in the heating roller 21 arranged in a conveyance direction A of the sheet S1, according to the present embodiment.

In FIG. 5, the three heater lamps 25*a* from the top are the heater lamps arranged at the vertices of the above triangle, and the heater lamp 25*b* at the bottom is the heater lamp arranged at the center of gravity G of the above triangle. In FIG. 5, the directions that are indicated by an arrow B indicate the longitudinal directions or axial directions of the heating roller 21, and the multiple heater lamps 25*a* and the heater lamp 25*b* are arranged parallel to the longitudinal direction B of the heating roller 21.

In the present embodiment, photothermal halogen lamps that serve as heater lamps to radiate infrared (IR) light are adopted. An object to be heated is heated by the radiant heat of the radiated infrared light. As illustrated in FIG. 5, each one of the heater lamps 25*a* and 25*b* that make up a halogen lamp is provided with, for example, a filament 33 that serves as a heating element, and a light-emitting tube 31 having a cylindrical shape to accommodate the filament 33. The filament 33 according to the present embodiment is formed by winding a metal wire made of, for example, tungsten (W) in a coil shape. The light-emitting tube 31 according to the present embodiment is formed of a material such as lime glass or quartz glass that transmits IR light. Moreover, the light-emitting tube 31 accommodates the filament 33, and is filled with substances such as halogen, halide, and inert gas. In order to handle such a situation, a pair of sealing portions 31*a* are formed at both ends of the light-emitting tube 31 such that the gas inside does not leak. A power supply circuit is coupled to both ends of the filament 33 through, for example, feeder lines. Once the power supply circuit starts supplying power to the filament 33, the filament 33 starts emitting and radiating IR light. When the inner surface of the heating roller 21 is irradiated with the radiated IR light, the multiple heating rollers 21 are heated.

The filament 33 has a densely wound portion where the metal wire is densely wound and a straight portion where the metal wire is not wound. The densely wound portion of the filament 33 serves as a heating area (or light-emitting area) H1 that generates heat (or emits light) by energization. On the other hand, the straight portion of the filament 33 serves as a non-heating area (or non-emitting area) H2 that barely generates heat (or barely emits light).

In the following description, the three heater lamps 25*a* that are arranged at the vertices of the regular triangle may be referred to as outer heater lamps 25*a*, and the one heater lamp 25*b* that is arranged inside the regular triangle at the center of gravity G is referred to as an inner heater lamp 25*b*. The heating area H1 of the outer heater lamp 25*a* and the heating area H1 of the inner heater lamp 25*b* are shifted from each other in the arrangement so as not to overlap with each other in the longitudinal direction B of the heating roller.

As illustrated in FIG. 5, the length of the heating area H1 of the inner heater lamp 25*b* in the longitudinal direction B of the heating roller 21 is shorter than the length of the heating areas H1 of the outer heater lamps 25*a*. In particular, in the present embodiment, the ratio of the length of the heating area H1 of the outer heater lamp 25*a* to the length of the heating area H1 of the inner heater lamp 25*b* is configured to be 3:1. The ratio of the lengths of the heating areas H1 is not limited to the above ratio and may be set to any ratio. As described above, in the present embodiment, the length and the arrangement of the heating area H1 of each one of the outer heater lamps 25*a* and the inner heater lamp 25*b* are different from each other, and the distribution of the thermal intensity or luminous intensity of each one of the outer heater lamps 25*a* and the inner heater lamp 25*b* is different. In other words, the three outer heater lamps 25*a* that are arranged at the vertices of a regular triangle are made of the first heat sources that have the same distribution of thermal intensity, and the one heater lamp 25*b* that is arranged inside the regular triangle at the center of gravity G is made of the second heat sources that have a distribution of thermal intensity different from that of the first heat sources FIG. 6A, FIG. 6B, FIG. 6C, and FIG. 6D are diagrams each illustrating the distribution of the thermal intensity or luminous intensity of the outer heater lamp 25*a* and the inner heater lamp 25*b*, according to the present embodiment.

Figure 6A:
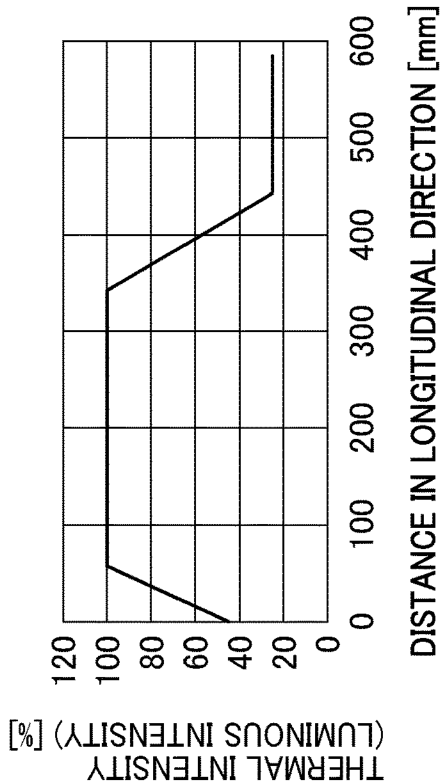
FIG. 6A, FIG. 6B, FIG. 6C, and FIG. 6D are diagrams each illustrating the distribution of the thermal intensity of an outer heater lamp and an inner heater lamp, according to an embodiment of the present disclosure.
Figure 6B:
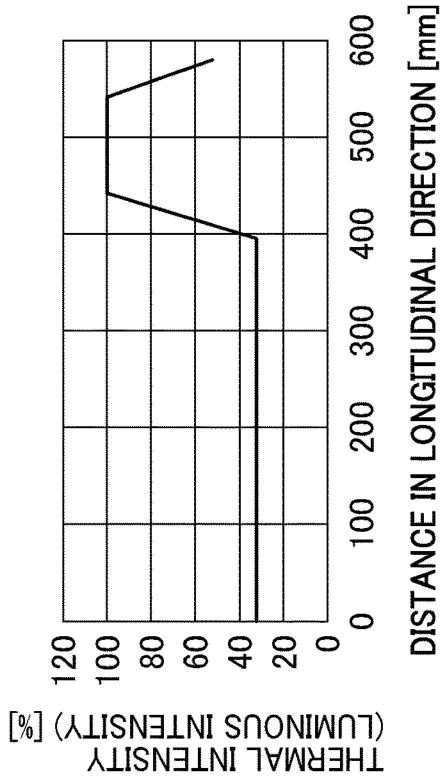

FIG. 6A is a diagram illustrating the distribution of the thermal intensity of the outer heater lamp 25*a* according to the present embodiment, and FIG. 6B is a diagram illustrating the distribution of the thermal intensity of the inner heater lamp 25*b* according to the present embodiment. In each one of FIG. 6A and FIG. 6B, the vertical axis indicates the thermal intensity or the luminous intensity, and the horizontal axis indicates the distance from the left end of the heater lamp 25*a* or 25*b* in FIG. 6A or FIG. 6B in the longitudinal direction.

Figure 6C:
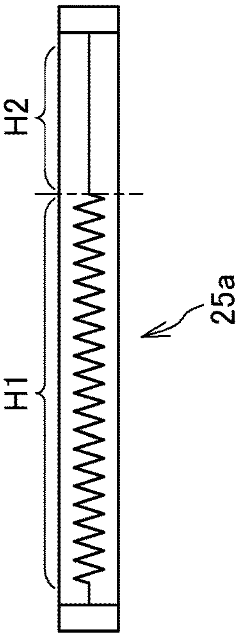
Figure 6D:
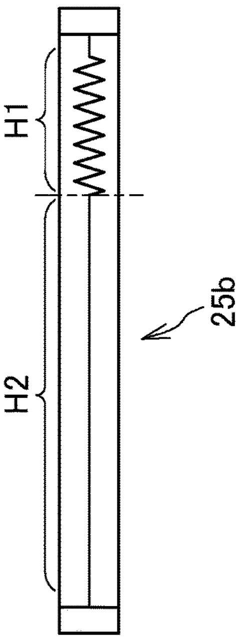

As illustrated in FIG. 6C and FIG. 6D, the lengths and positions of the heating areas H1 are different from each other in the outer heater lamp 25*a* and the inner heater lamp 25*b*, and the distribution of the thermal intensity of the outer heater lamp 25*a* in the longitudinal direction is different from that of the inner heater lamp 25*b*. In such cases, an area with high thermal intensities is on the left of the graph in the outer heater lamp 25*a*, and an area with high thermal intensities is on the right of the graph in the inner heater lamp 25*b*.

Figure 7:
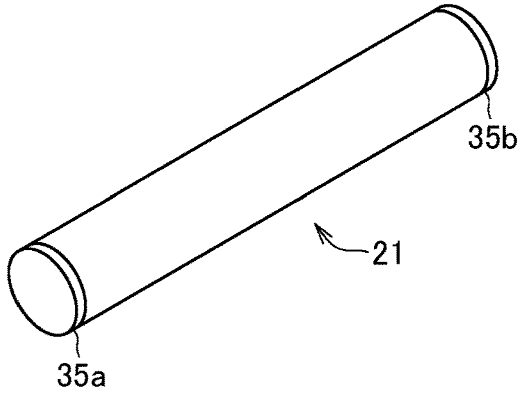
FIG. 7 is a perspective view of a heating roller according to an embodiment of the present disclosure.

FIG. 7 is a perspective view of the heating roller 21 according to the present embodiment.

In the present embodiment described with reference to FIG. 7, a pair of temperature sensors 35*a* and 35*b* are arranged at both ends of the heating roller 21 in the longitudinal direction of the heating roller 21, and those temperature sensors measure the temperatures of the heating roller 21 at both ends and the temperatures of areas around the ends of the heating roller 21. The temperature sensor 35*a* that is arranged at one end of the heating roller 21 is used to control the three outer heater lamps 25*a* that have the heating areas H1 close to that end of the heating roller 21. On the other hand, the temperature sensor 35*b* that is arranged at the other end of the heating roller 21 is used to control the one inner heater lamp 25*b* that has the one heating area H1 close to that end of the heating roller 21. In other words, the main controller 60 controls the heater power controller 68 based on the temperature information measured by those temperature sensors 35*a* and 35*b* and the temperature information input to the above heater temperature input unit 65. Due to such a configuration, the heat liberation or the light emission of the multiple heater lamps 25*a* and 25*b* is controlled.

Figure 8:
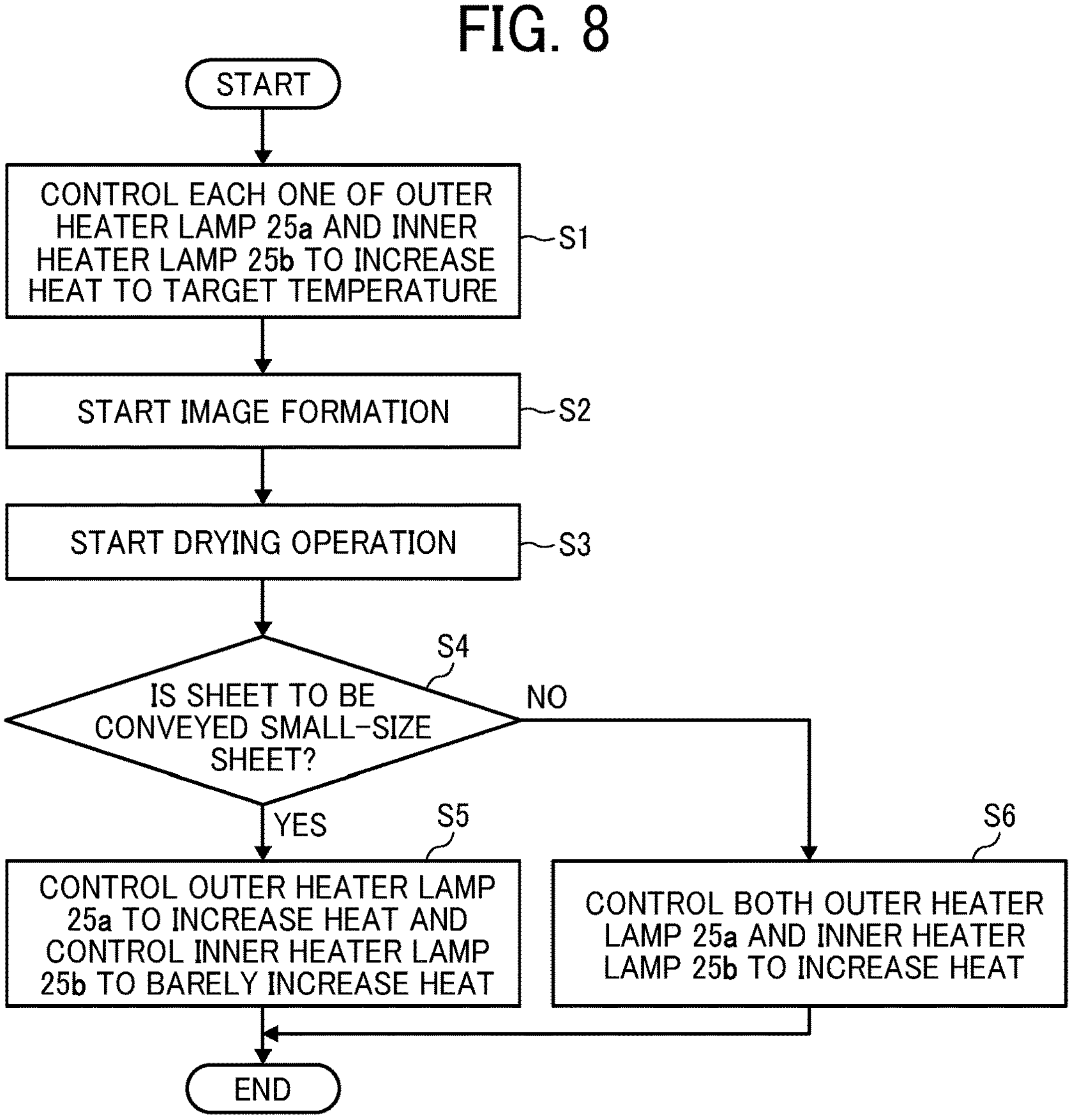
FIG. 8 is a flowchart of the steps in a method of controlling an outer heater lamp and an inner heater lamp, according to an embodiment of the present disclosure.

FIG. 8 is a flowchart of the steps in a method of controlling the outer heater lamp 25*a* and the inner heater lamp 25*b*, according to the present embodiment.

In the present embodiment, a proportional integral derivative (PID) control is adopted as a method of controlling each one of the heater lamp 25*a* and the heater lamp 25*b*. The PID control is a control method in which proportional, integral, and differential operations are performed in a combined manner according to the deviation between a target value and a controlled variable. The method of controlling the multiple heater lamps 25*a* and the heater lamp 25*b* is not limited to the PID control.

When the control of the multiple heater lamps 25*a* and 25*b* is started, in step S1 of FIG. 8, each one of the heater lamp 25*a* and the heater lamp 25*b* is controlled by the PID control to increase the heat to a target temperature, e.g., 120 degrees Celsius (° C.). After that, when each one of the heater lamp 25*a* and the heater lamp 25*b* reaches a target temperature, in step S2 of FIG. 8, image formation on the sheet S starts. When the image is formed on the sheet, the sheet is conveyed to the drying device, and in step S3 of FIG. 8, the drying operation of the sheet is started in the drying device.

Figure 9:
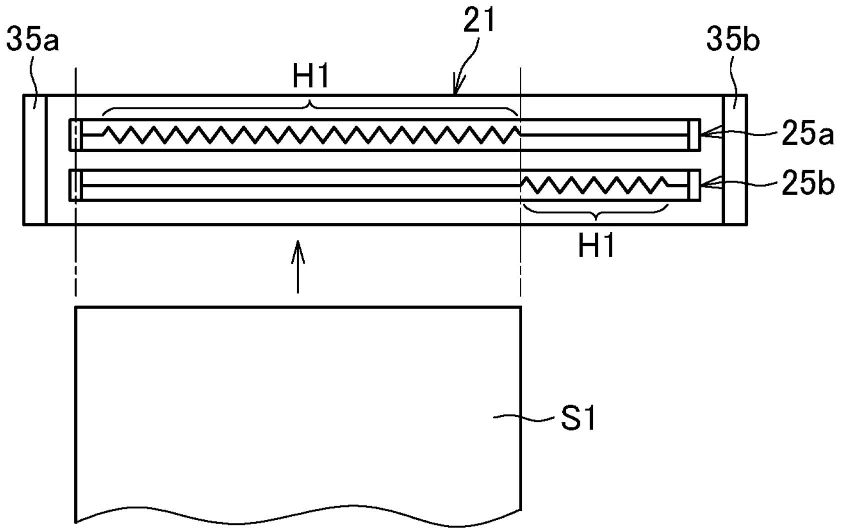
FIG. 9 is a diagram illustrating a mode in which a small-size sheet is heated by one of heating rollers, according to an embodiment of the present disclosure.

FIG. 9 is a diagram illustrating a mode in which the small-size sheet S1 is heated by one of the heating rollers 21, according to the present embodiment.

In the present embodiment, when the sheet S1 to be conveyed to the drying device is, for example, a small-size sheet whose width is twice wider than that of A3 sheet ("YES" in step S4 in FIG. 8), as illustrated in FIG. 9, the sheet S1 is shifted to one end of the heating roller 21 (i.e., the left end of the heating roller in FIG. 9) and is conveyed. In this configuration, the heat of the heating rollers 21 is taken away by the sheet S1 in the region through which the sheet S1 passes, and the temperature of the heating roller 21 decreases. In order to handle such a situation, when the temperature of the heating roller 21 detected by the temperature sensor 35*a*, which is arranged at one end of the heating roller, runs below a predetermined temperature, the outer heater lamp 25*a* that has the heating area H1 at one end is controlled to increase the heat to a target temperature (for example, 120 degrees Celsius (° C.)) based on the PID control. The other outer heater lamps 25*a* are also controlled in a similar manner. By contrast, the heat is barely consumed due to the passage of the sheet S1 in the region at the other end of the heating roller 21 through which the sheet S1 does not pass (see the right side in FIG. 9). Accordingly, in step S5 of FIG. 8, the inner heater lamp 25*b* that has the heating area H1 at the other end of the heating roller 21 barely liberates heat due to the PID control.

Figure 10:
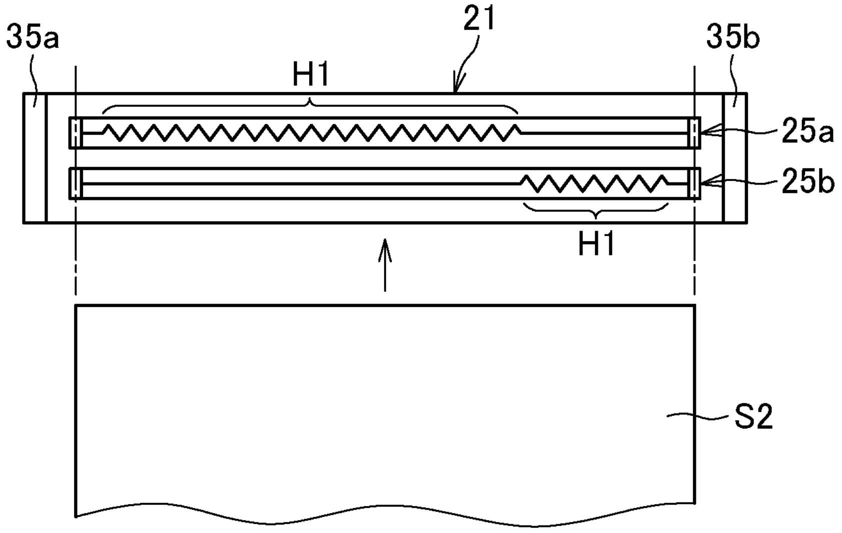
FIG. 10 is a diagram illustrating a mode in which a large-size sheet is heated by a heating roller, according to an embodiment of the present disclosure.

FIG. 10 is a diagram illustrating a mode in which a large-size sheet is heated by one of the heating rollers 21, according to the present embodiment.

When the sheet S1 conveyed to the drying device is a large-size sheet whose width is three times wider than B3 sheets ("NO" in step S4 of FIG. 8), as illustrated in FIG. 10, the sheet S2 is conveyed so as to pass through substantially the entirety of the heating roller 21 in the longitudinal direction B. In such a configuration, as the sheet S2 passes by the heating roller 21, the heat of substantially the entire area of the heating roller 21 in the longitudinal direction B is consumed, and the temperature of the entire area of the heating roller 21 falls. In order to deal with such a situation, when the temperatures of the heating roller 21 at both ends detected by the temperature sensors 35*a* and 35*b* run below a predetermined temperature, in step S6 of FIG. 8, both the outer heater lamp 25*a* and the inner heater lamp 25*b* are controlled to increase the heat to a target temperature (for example, 120 degrees Celsius (° C.)) based on the PID control.

As described above, in the present embodiment, even when sheets having different sizes in width are conveyed, the heat liberation of the outer heater lamps 25*a* and the inner heater lamp 25*b* is controlled based on the temperatures detected by the temperature sensors 35*a* and 35*b* arranged at both ends of the heating roller 21, using the PID control. Due to such a configuration, the temperatures of the heating rollers 21 can be maintained at a predetermined temperature.

Figure 11:
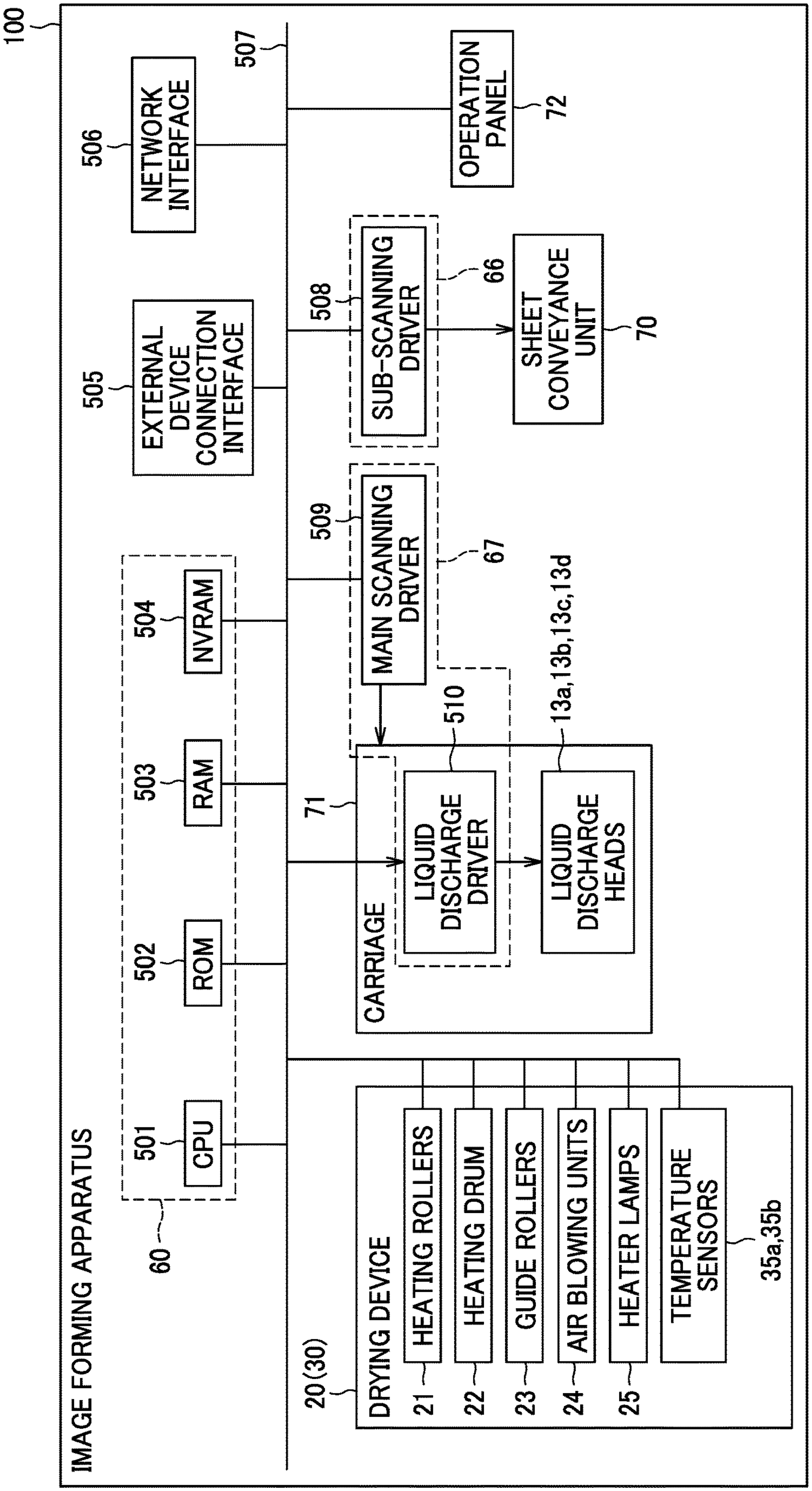
FIG. 11 is a block diagram illustrating a more specific control structure or configuration of an image forming apparatus according to an embodiment of the present disclosure.

FIG. 11 is a block diagram illustrating a more specific control structure or configuration of the image forming apparatus 100, according to the present embodiment.

As illustrated in FIG. 11, the image forming apparatus 100 according to the present embodiment includes a central processing unit (CPU) 501, a read-only memory (ROM) 502, a random access memory (RAM) 503, a non-volatile random access memory (NVRAM) 504, an external device connection interface (I/F) 505, a network interface (I/F) 506, and a bus line 507. The image forming apparatus 100 also includes a sheet conveyance unit 70, a sub-scanning driver 508, a main scanning driver 509, a carriage 71, and an operation panel 72. The carriage 71 according to the present embodiment includes a plurality of liquid discharge heads 13*a*, 13*b*, 13*c*, and 13*d*, and a liquid discharge driver 510.

The CPU 501, the ROM 502, the RAM 503, and the NVRAM 504 according to the present embodiment are included in the main controller 60 illustrated in FIG. 2. The CPU 501 according to the present embodiment controls the overall operation of the image forming apparatus 100. The ROM 502 according to the present embodiment stores a program such as an initial program loader (IPL) used to drive the CPU 501. The RAM 503 according to the present embodiment is used as a work area for the CPU 501. The NVRAM 504 according to the present embodiment stores various kinds of data such as a program, and retains various kinds of data while the power source for the image forming apparatus 100 is cut out.

The external device connection interface 505 is coupled to a personal computer (PC) through, for example, a universal serial bus (USB) cable, and communicates with the PC to exchange the data of an image to be printed or a control signal with the PC. The network interface 506 is an interface used to exchange data with an external device through a communication network such as the Internet. The bus line 507 is, for example, an address bus or a data bus, which electrically connects the multiple elements such as the CPU 501 to each other.

The sheet conveyance unit 70 includes, for example, a roller and a motor used to drive the roller, and conveys the sheet S1 intermittently in the sub-scanning direction parallel to the sheet conveyance direction, along the conveyance path in the image forming apparatus 100. The sub-scanning driver 508 according to the present embodiment serves as the sheet conveyance controller 66 illustrated in FIG. 2, and is a driver that controls the conveyance of the sheet S1 in the sub-scanning direction by the sheet conveyance unit 70.

The carriage 71 according to the present embodiment is a head holding member provided with the multiple liquid discharge heads 13*a*, 13*b*, 13*c*, and 13*d*, and is movable in the main scanning direction intersecting the sheet conveyance direction. While the carriage 71 is moving in the main scanning direction, ink is discharged from the multiple liquid discharge heads 13*a*, 13*b*, 13*c*, and 13*d* onto the sheet S1, which is intermittently conveyed in the sub-scanning direction. As a result, an image is formed at a prescribed position of the sheet S1. In so doing, the main scanning driver 509 controls the movement of the carriage 71 in the main scanning direction, and the liquid discharge driver 510 controls the operation of the multiple liquid discharge heads 13*a*, 13*b*, 13*c*, and 13*d*. The main scanning driver 509 and the liquid discharge driver 510 according to the present embodiment serve as the liquid discharge head controller 67 illustrated in FIG. 2.

It is not always necessary for the liquid discharge driver 510 to be provided for the carriage 71. Alternatively, the liquid discharge driver 510 may be coupled to the bus line 507 outside the carriage 71. Each one of the main scanning driver 509, the sub-scanning driver 508, and the liquid discharge driver 510 may be a function implemented by a command executed by the CPU 501 based on a program.

The operation panel 72 according to the present embodiment is composed of, for example, a touch panel and an alarm lamp that display, for example, current set values and a panel of options to be selected and accept inputs from an operator. The operation panel 72 according to the present embodiment serves as, for example, the image data input unit 61, the speed input unit 63, the sheet data input unit 64, and the heater temperature input unit 65 illustrated in FIG. 2.

The CPU 501 according to the present embodiment also controls the operations of other various types of components of the first drying device 20 or the second drying device 30 provided for the image forming apparatus 100. For example, the CPU 501 controls the rotation of the multiple heating rollers 21, the rotation of the heating drum 22, the rotation of the multiple guide rollers 23, and the air-blowing operation of the air blowing unit 24. The CPU 501 also controls the heat generation by the multiple heater lamps 25 inside the multiple heating rollers 21 based on the temperatures of the multiple heating rollers 21 detected by the pair of temperature sensors 35*a* and 35*b*.

Some comparative examples that are different from the above embodiments of the present disclosure are described below.

Figure 12:
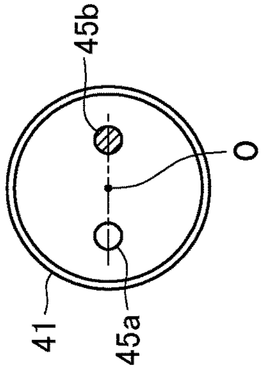
FIG. 12 is a side view of a heating roller as viewed from one end of itself in the longitudinal direction parallel to the rotation axis direction, according to the first comparative example of the present disclosure.

FIG. 12 is a side view of a heating roller 41 as viewed from one end of itself in the longitudinal direction parallel to the rotation axis direction, according to the first comparative example of the present disclosure.

As illustrated in FIG. 12, unlike the above embodiments of the present disclosure, a pair of heater lamps 45*a* and 45*b* are arranged inside the heating roller 41 in the first comparative example of the present disclosure. In other words, the number of heater lamps is smaller by two in the first comparative example of the present disclosure than the number of heater lamps in the above embodiments of the present disclosure. In the present comparative example, the pair of heater lamps 45*a* and 45*b* have point symmetry with respect to the rotation center O of the heating roller 41. In other words, in the present comparative example, the pair of heater lamps 45*a* and 45*b* are arranged at positions equidistant from the rotation center O on the same straight line passing through the rotation center O.

FIG. 13A, FIG. 13B, FIG. 13C, and FIG. 13D are diagrams each illustrating the distribution of thermal intensity (intensity distribution of light emission) of a pair of heater lamps 45*a* and 45*b*, according to the first comparative example of the present disclosure.

Figure 13A:
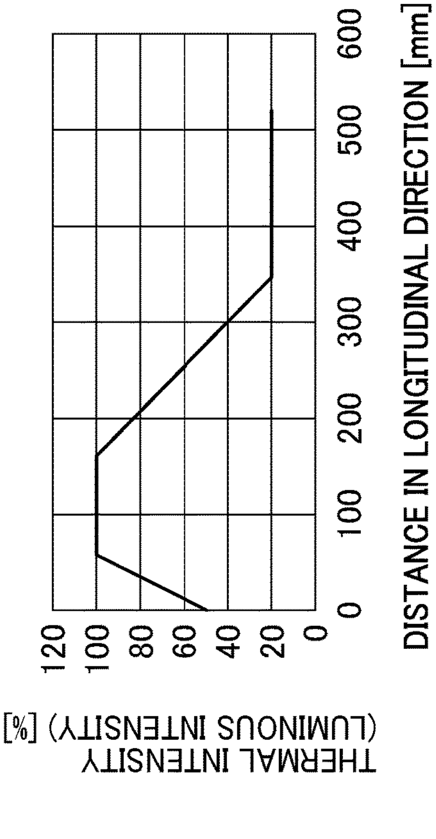
FIG. 13A, FIG. 13B, FIG. 13C, and FIG. 13D are diagrams each illustrating the distribution of thermal intensity of a pair of heater lamps, according to the first comparative example of the present disclosure.
Figure 13B:
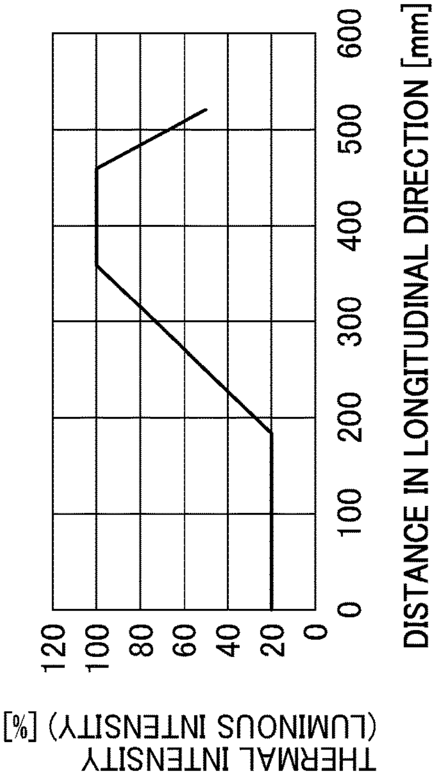

More specifically, FIG. 13A illustrates the distribution of the thermal intensity of the inner heater lamp 45*a* on one hand, and FIG. 13B illustrates the distribution of the thermal intensity of the inner heater lamp 45*b* on the other hand. In each one of FIG. 13A and FIG. 13B, the vertical axis indicates the thermal intensity or the luminous intensity, and the horizontal axis indicates the distance from the left end of the heater lamp 45*a* or 45*b* in FIG. 13A or FIG. 13B in the longitudinal direction.

Figure 13C:
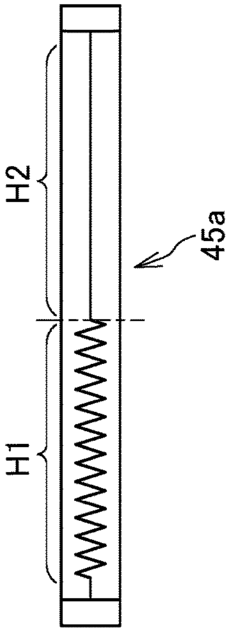
Figure 13D:
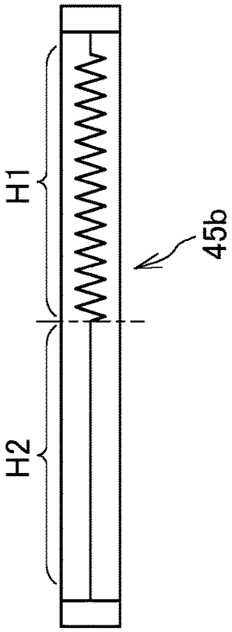

Between the pair of heater lamps 45*a* and 45*b* described with reference to FIG. 13C and FIG. 13D, the positions of the heating areas H1 are different from each other in the longitudinal direction B of the heating roller 41. Accordingly, the distribution of thermal intensity of the heater lamp 45*a* is different from the distribution of thermal intensity of heater lamp 45*b*. Except for the length and arrangement of the heating area H1, each one of the pair of heater lamps 45*a* and 45*b* according to the first comparative example of the present disclosure is a halogen lamp whose configuration or structure is equivalent to the heater lamps according to the embodiments of the present disclosure described above.

An examination is described below in which the rises in temperature of the light-emitting tubes of the pair of heater lamps 45*a* and 45*b* were examined when the heating roller 41 according to the first comparative example of the present disclosure as described above was used and the output power or power supply of the pair of heater lamps 45*a* and 45*b* was changed. More specifically, a roller whose interior diameter and length in the longitudinal direction or the axial direction are 50 millimeters (mm) and 520 mm, respectively, was used as the heating roller 41 in the present examination.

The outer diameter of each of the pair of heater lamps 45*a* and 45*b* was set to 10 mm, and the center-to-center distance between the pair of heater lamps 45*a* and 45*b* was set to 30 mm. Moreover, the shortest distance between each of the heater lamps 45*a* and 45*b* and the inner surface of the heating roller 41 was set to 5 mm. The heat resistance of the light-emitting tubes of the pair of heater lamps 45*a* and 45*b* was 800 degrees Celsius (° C.). When the pair of heater lamps 45*a* and 45*b* were caused to emit light under such conditions, the relation between the output power (or supplied power) per heater lamp and the temperature of the light-emitting tubes at that time was obtained as depicted in the first table given below.

First Table

It is understood from the relation depicted in the above first table that, as the outputs of the heater lamps 45*a* and 45*b* increase, the temperature of the light-emitting tube also increases accordingly. In particular, when the output of each one of the pair of heater lamps 45*a* and 45*b* reached 3000 watts (W), the temperature of the light-emitting tube exceeded its heat resistance of 800 degrees Celsius (° C.) and reached 805 degrees Celsius (° C.). In view of the above circumstances, the output of each one of the pair of heater lamps 45*a* and 45*b* is to be controlled under 2900 W, which is lower than 3000 W, such that the temperature of the light-emitting tube does not exceed the heat resistance. Accordingly, in the first comparative example of the present disclosure, the upper limit of the total output of the pair of heater lamps 45*a* and 45*b* is 5800 W (=2900 W×2).

Figure 14:
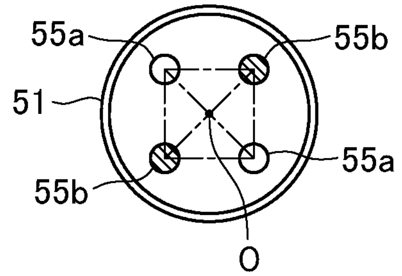
FIG. 14 is a side view of a heating roller as viewed from one end of itself in the longitudinal direction parallel to the rotation axis direction, according to the second comparative example of the present disclosure.

FIG. 14 is a side view of a heating roller 51 as viewed from one end of itself in the longitudinal direction parallel to the rotation axis direction, according to the second comparative example of the present disclosure.

In the heating roller 51 according to the second comparative example of the present disclosure, in order to increase the upper limit of the total output of the heater lamps 55*a* and 55*b*, the number of the heater lamps 55*a* and 55*b* is increased to a greater number than the number of heater lamps in the above first comparative example of the present disclosure. As illustrated in FIG. 14, four heater lamps 55*a* and 55*b* are arranged inside the heating roller 51. In the present comparative example, those four heater lamps 55*a* and 55*b* are arranged at the vertices of a square, and have point symmetry with respect to the rotation center O of the heating roller 51.

Among the four heater lamps 55*a* and 55*b*, the pair of heater lamps 55*a* arranged on the same diagonal line of the square have a distribution of thermal intensity different from the pair of heater lamps 55*b* arranged on the other diagonal line of the square. More specifically, in FIG. 14, the pair of top right and bottom left heater lamps 55*a* are heat sources having the distribution of thermal intensity illustrated in FIG. 13A, and the pair of bottom right and top left heater lamps 55*b* are heat sources having the distribution of thermal intensity illustrated in FIG. 13B.

Also in the second comparative example of the present disclosure, the relation between the output power (or supplied power) of the heater lamps 55*a* and 55*b* and the temperature rise of the light-emitting tube was examined. In the present comparative example, the center-to-center distance between each one of the pairs of heater lamps 55*a* and 55*b*, which are adjacent to each other in the up and down directions and the right and left directions, was set to 30 mm. The other configurations or conditions of the present comparative example are equivalent to the configurations or conditions of the first comparative example of the present disclosure described above. The relation between the output power (or supplied power) of each one of the heater lamps 55*a* and 55*b* and the temperature of the light-emitting tube in the second comparative example of the present disclosure is depicted in the second table given below.

Second Table

As depicted in the above second table, in the second comparative example of the present disclosure, when the output of each one of the pairs of heater lamps 55*a* and 55*b* reached 2600 W, the temperature of the light-emitting tube exceeded its heat resistance of 800 degrees Celsius (° C.) and reached 806 degrees Celsius (° C.). In view of the above circumstances, the output of each one of the pairs of heater lamps 55*a* and 55*b* is to be controlled under 2500 W, which is lower than 2600 W, such that the temperature of the light-emitting tube does not exceed the heat resistance. Accordingly, in the second comparative example of the present disclosure, the upper limit of the total output of the four heater lamps 55*a* and 55*b* is 10000 W (=2500×4).

As described above, in the second comparative example of the present disclosure, the number of the heater lamps 55*a* and 55*b* is increased by two compared with the first comparative example of the present disclosure, and thus the maximum power of each one of the pairs of heater lamps 55*a* and 55*b* is reduced. However, the total output of the heater lamps 55*a* and 55*b* is greater than the total output of the heater lamps in the first comparative example of the present disclosure, which is 5800 W indicating the upper limit of the total output. On the other hand, when any greater number of heater lamps cannot be arranged in each one of the heating rollers in the second comparative example of the present disclosure, the total output of the heater lamps is limited to the upper limit 10000 W.

By contrast, in the above embodiments of the present disclosure, the upper limit of the total output of the heater lamps 25*a* and 25*b* can further be increased. The upper limit of the total output of the heater lamps 25*a* and 25*b* in the embodiments of the present disclosure is described below with reference to the third table that indicates the examination results.

In the examination according to the embodiments of the present disclosure, the relation between the output power (or supplied power) of the heater lamps 25*a* and 25*b* and the temperature rise of the light-emitting tube 31 was examined in a similar manner to the examinations according to the above multiple comparative examples. More specifically, as illustrated in FIG. 4, the multiple heater lamps 25*a* and the heater lamp 25*b* are arranged at the vertices and the center of gravity G of a regular triangle, and the center-to-center distance between each pair of the heater lamps 25*a* located at the vertices is set to 26 mm. The center-to-center distance between each one of the heater lamps 25*a* located at the vertices and the heater lamp 25*b* located at the center of gravity G is controlled to be 15 mm, and except that, the temperature of the light-emitting tube is measured for each output power (or supplied power) of the heater lamps under the same conditions as the examination according to the first comparative example as above. The relation between the output power (or supplied power) of each one of the heater lamps 25*a* and 25*b* and the temperature of the light-emitting tube 31 in the examination according to the embodiments of the present disclosure is depicted in the third table given below.

Third Table

As depicted in the above third table, in the embodiments of the present disclosure, when the output power of each one of the heater lamps reached 2800 W, the temperature of the light-emitting tube exceeded its heat resistance of 800 degrees Celsius (° C.) and reached 803 degrees Celsius (° C.). Accordingly, the output power of each one of the heater lamps is allowable when the output power is 2700 W, which is lower than 2800 W, and the upper limit of the total output of four heater lamps in the embodiments of the present disclosure, is 10,800 W, which is calculated by multiplying 2700 W by four.

To sum up, the upper limits of the total output of multiple heater lamps in the above multiple examinations are depicted in the fourth table given below.

Fourth Table

Firstly, when the upper limits of the total outputs of the first comparative example and the second comparative example of the present disclosure are compared with each other, the allowable upper limit of the total output of the heater lamps is significantly increased from 5800 W in the first comparative example to 10000 W in the second comparative example of the present disclosure. In other words, the allowable upper limit of the total output of the heater lamps is 1.7 times increased in the second comparative example of the present disclosure. In view of the above circumstances, it can be said that increasing the number of heater lamps from two to four is an effective means for increasing the amount of heat supply of the heating rollers. By contrast, the same number of those heater lamps are used in both the second comparative example of the present disclosure and the above embodiments of the present disclosure. In other words, four heater lamps are used in both the second comparative example of the present disclosure and the above embodiments of the present disclosure. In the embodiments of the present disclosure, however, compared with the second comparative example of the present disclosure, the maximum power output of each one of the heater lamps can be increased from 2500 W to 2700 W, and the upper limit of the allowable total output power of the heater lamps can also be increased from 10000 W to 10800 W. In other words, in the embodiments of the present disclosure, even if the number of the heater lamps is four as in the second comparative example, the upper limit of the total output of the heater lamps 25*a* and 25*b* can further be increased by arranging the heater lamps at the vertices of a regular triangle and the center of gravity.

As described above, in the embodiments of the present disclosure, the heater lamps are arranged at the vertices of a regular triangle and the center of gravity, and the upper limit of the total output of the heater lamps can be increased without exceeding the range of heat resistance of the light-emitting tube and without increasing the number of the heater lamps. Accordingly, even when the size or cost of the apparatus is limited, the amount of heat supply of the heating rollers can effectively be increased while reducing the size and production cost of the apparatus, and the drying function of the drying device can be enhanced. Accordingly, with the embodiments of the present disclosure, for example, cases in which a thick sheet is conveyed or the conveyance speed of the sheet is increased in order to increase productivity can be dealt with.

Instead of only one outer heater lamp, a plurality of outer heater lamps 25*a* each of which has a long heating area H1 are arranged inside the heating roller 21 in the embodiments of the present disclosure. More specifically, three outer heater lamps 25*a* are arranged in the above embodiments of the present disclosure. Accordingly, compared with a configuration in which only one outer heater lamp 25*a* is arranged, the density of heat liberation of the outer heater lamps 25*a* or the output power per unit length of one heater lamp can be reduced. In other words, when only one outer heater lamp 25*a* is available, the density of heat liberation of the outer heater lamp 25*a* needs to be increased in order to achieve the desired amount of heat generation for heating the heating rollers 21. However, if the number of outer heater lamps 25*a* is increased to two or more as in the embodiments of the present disclosure, the density of heat liberation of the outer heater lamps 25*a* can be reduced. The temperature of the light-emitting tube of the heater lamps increases depending on the density of heat liberation of the heater lamps and the length of the heating area, which may be referred to as a light-emission length in the following description. For this reason, it is desired that the density of heat liberation of the heater lamps be smaller such that the temperature of the light-emitting tube does not exceed the heat resistance. As in the embodiments of the present disclosure, a plurality of outer heater lamps 25*a* are arranged to reduce the density of heat liberation of each one of the outer heater lamps 25*a*. By so doing, the temperature of the light-emitting tube can be prevented from increasing.

By contrast, the heating area H1 of the inner heater lamp 25*b* is shorter than the heating area H1 of each one of the outer heater lamps 25*a*. Accordingly, the density of heat liberation of the inner heater lamp 25*b* is set to be high. More specifically, in the embodiments of the present disclosure, the length of the heating area H1 of the inner heater lamp 25*b* is one-third of the length of the heating area H1 of the outer heater lamp 25*a*, and thus the density of heat liberation of the inner heater lamp 25*b* is three times higher the density of heat liberation of the outer heater lamp 25*a*. As described above, in the embodiments of the present disclosure, the density of heat liberation of the inner heater lamp 25*b* is set to be high. On the contrary, the length of the heating area H1 of the inner heater lamp 25*b* is short. Accordingly, even if the inner heater lamp 25*b* emits light, the temperature of the light-emitting tube does not exceed the heat resistance. Further, in the embodiments of the present disclosure, the heating area H1 of the outer heater lamp 25*a* and the heating area H1 of the inner heater lamp 25*b* are arranged so as not to overlap each other in the longitudinal direction B of the heating roller. Compared with cases where these heating areas are arranged so as to overlap each other, an excessive increase in the temperature of the light-emitting tube can be avoided. Accordingly, in the embodiments of the present disclosure, the temperature of the light-emitting tube can be kept within the range of its heat-resistant while maintaining a desired amount of output or heat generation for heating the heating rollers 21.

In the above description, some preferred embodiments of the present disclosure are described. However, no limitation is intended by those embodiments of the present disclosure. For example, the positions at which the three outer heater lamps 25*a* are arranged are not limited to the vertices of a regular triangle, but may be the vertices of any other triangles other than the regular triangle. The position at which the inner heater lamp 25*b* is arranged is not limited to the center of gravity of the regular triangle or other triangles, but may be any position such as any point inside the regular triangle or other triangles other than the center of gravity.

The multiple outer heater lamps 25a may be arranged at the vertices of any other polygons in addition to triangles.

Figure 15:
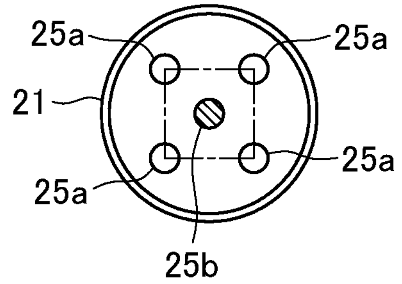
FIG. 15 is a diagram illustrating another arrangement of heater lamps according to an alternative embodiment of the present disclosure.

FIG. 15 is a diagram illustrating another arrangement of the heater lamps 25a and 25b according to an alternative embodiment of the present disclosure.

Figure 16:
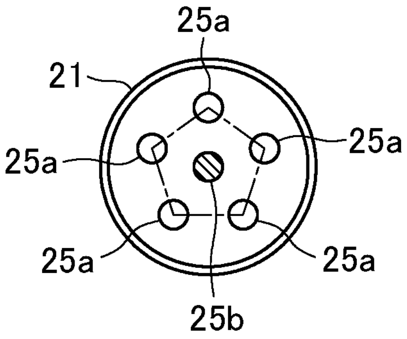
FIG. 16 is a diagram illustrating another arrangement of heater lamps according to another alternative embodiment of the present disclosure.

For example, as in the present alternative embodiment described with reference to FIG. 15, four heater lamps 25a with the same distribution of thermal intensity, which serve as the first heat sources, may be arranged at the vertices of a rectangle, and one heater lamp 25b with a distribution of thermal intensity different from that of those four heater lamps 25a, which serves as the second heat source, may be arranged inside the rectangle or at the center of gravity FIG. 16 is a diagram illustrating another arrangement of the heater lamps 25a and 25b according to another alternative embodiment of the present disclosure.

As in the present alternative embodiment described with reference to FIG. 16, five heater lamps 25a with the same distribution of thermal intensity, which serve as the first heat sources, may be arranged at the vertices of a pentagon, and one heater lamp 25b with a distribution of thermal intensity different from that of those five heater lamps 25a, which serves as the second heat source, may be arranged inside the pentagon or at the center of gravity.

When the number of heater lamps is to be further increased, in a similar manner to the above alternative embodiment, a plurality of heater lamps with the same distribution of thermal intensity may be arranged at the vertices of a polygon, and one heater lamp with a distribution of thermal intensity different from that of those multiple heater lamps may be arranged inside the polygon or at the center of gravity.

The number of the heater lamps 25a and 25b arranged in each one of the heating rollers 21 may be three.

Figure 17:
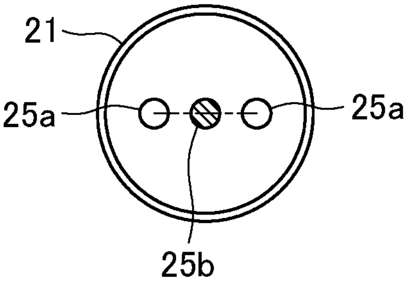
FIG. 17 is a diagram illustrating another arrangement of heater lamps according to yet another alternative embodiment of the present disclosure.

FIG. 17 is a diagram illustrating another arrangement of the heater lamps 25a and 25b according to yet another alternative embodiment of the present disclosure.

When the number of the heater lamps arranged in each one of the heating rollers is three, as illustrated in, for example, FIG. 17, the pair of heater lamps 25a with the same distribution of thermal intensity, which serve as the first heat sources, are to be arranged with gap therebetween, and the one heater lamp 25b with a distribution of thermal intensity different from that of the pair of heater lamps 25a, which serves as the second heat source, is to be arranged between the pair of heater lamps 25a. The heater lamp 25b that is arranged between the pair of heater lamps 25a may be at an intermediate position equidistant from the two heater lamps 25a, or may be at a position shifted from the intermediate position.

Also in the multiple alternative embodiments of the present disclosure described above with reference to FIG. 15, FIG. 16, and FIG. 17, the maximum power output of each one of the heater lamps can be increased without increasing the number of the heater lamps. Accordingly, the amount of heat supply can effectively be increased without exceeding the range of heat resistance of the light-emitting tube. Also in the multiple alternative embodiments of the present disclosure described above with reference to FIG. 15, FIG. 16, and FIG. 17, in a similar manner to the above embodiments of the present disclosure, the heating area H1 of the heater lamp 25b that serves as the second heat source and is arranged inside the multiple heater lamps 25a or between the pair of heater lamps 25a may be made shorter than each one of the heating areas H1 of the surrounding heater lamps 25a that serve as the first heat sources, or the heating areas H1 may be arranged so as not to overlap each other in the longitudinal direction of the heating roller 21. Due to such a configuration, the temperature of the light-emitting tube can be prevented from increasing.

A configuration or structure according to the embodiments of the present disclosure can be applied not only to a heating roller driven to rotate while contacting the sheet that is being conveyed but also to a heating roller that is actively driven to rotate by a driving source such as a motor while contacting the sheet that is being conveyed. Alternatively, a configuration or structure according to the embodiments of the present disclosure may be applied to, for example, a heating roller that does not rotate but is in sliding contact with the sheet that is being conveyed.

A configuration or structure according to the embodiments of the present disclosure can be applied not only to the arrangement of heater lamps that do not rotate together with the heating rollers but are held in the same position, but also to the arrangement of heater lamps that rotate together with the heating rollers.

The heater lamps according to the embodiments of the present disclosure are not limited to halogen lamps, but may be other kinds of heat sources. For example, the heater lamps according to the embodiments of the present disclosure may be photothermal heat sources such as carbon heaters.

The drying device according to the above embodiments of the present disclosure may include a plurality of drying devices of different types, and such drying devices of different types may be arranged upstream from or downstream from any one of the multiple heating rollers 21 in the sheet conveyance direction. The drying device according to the above embodiments of the present disclosure may dry the sheet using a plurality of drying methods. Such drying devices of different types include, for example, drying means such as a blower that involves air blowing or ventilation, in addition to a non-contact drying device and heating means such as an IR light irradiation device or an ultraviolet (UV) light irradiation device that involves optical energy to dry ink droplets. The non-contact drying means is used to dry the surface onto which liquid is to be applied or the rear side of the surface onto which liquid is to be applied. With the adoption of a configuration or structure according to the embodiments of the present disclosure, also in such drying devices of different types, the drying function of the drying device can be enhanced while reducing the size and production cost of the apparatus.

By way of example, the first drying device 20 or the second drying device 30 provided for the image forming apparatus 100 that adopts inkjet printing is described as the heating device according to the embodiments of the present disclosure. However, no limitation is intended thereby, and the embodiments of the present disclosure may be applied to a heating device that heats an object to be heated such as a sheet for something other than drying. For example, the embodiments of the present disclosure may be applied to a heating device provided for image forming apparatuses that adopt electrophotography to form an image using toner.

By way of example, cases in which the heating devices of the drying device are provided for an inkjet image forming apparatus that serves as a liquid discharge apparatus are described in the above embodiments of the present disclosure. However, no limitation is indicated thereby, and the heating device according to the embodiments of the present disclosure may be applied to any other kinds of liquid discharge apparatuses.

Such a liquid discharge apparatus is provided with a plurality of liquid discharge devices, and drives those liquid discharge devices to discharge liquid onto a sheet.

The liquid discharge apparatus to which the embodiments of the present disclosure are applied includes, for example, a unit used to feed, convey, or eject a sheet, a pretreatment device, and a post-processing apparatus such as a sheet processing apparatus.

In the liquid discharge apparatus, the multiple liquid discharge devices may move relative to the sheet, or the multiple liquid discharge devices may not move relative to the sheet. Examples of the liquid discharge apparatus include, for example, a serial liquid discharge apparatus in which the multiple liquid discharge heads such as the liquid discharge devices are moved, and a line liquid discharge apparatus in which the multiple liquid discharge heads such as the liquid discharge devices are not moved.

The liquid discharge apparatus according to the embodiments of the present disclosure is not limited to an apparatus that uses discharged liquid to visualize an image such as a character and a figure. For example, the liquid discharge apparatus according to the embodiments of the present disclosure includes an apparatus that forms, for example, patterns having no meaning in themself, and an apparatus that forms a three-dimensional image. Alternatively, the liquid discharge apparatus according to the embodiments of the present disclosure includes, for example, a treatment-liquid discharge apparatus that discharges treatment liquid onto the surface of a sheet for the purposes of, for example, reforming the surface of the sheet.

The sheet according to the above embodiments of the present disclosure is an object to which liquid can at least temporarily adhere, and includes, for example, a sheet to which liquid adheres and is fixed and a sheet to which liquid adheres and permeates. Concrete examples of the sheet include a recording medium such as a sheet of paper, a recording sheet, a film, and cloth, and an electronic substrate.

The material of the sheet may be, for example, paper, thread, fiber, cloth, leather, metal, plastic, glass, wood, and ceramic, and is satisfactory as long as the liquid can adhere thereto even on a temporary basis.

The liquid that is discharged by the above liquid discharge apparatus is satisfactory as long as it has viscosity or surface tension and it can be discharged from the liquid discharge device, and no limitation is indicated thereby. It is desired that such liquid has viscosity equal to or less than 30 millipascal-second (mPa·s) at normal temperature and under normal atmospheric pressure. Alternatively, it is desired that such liquid has viscosity equal to or less than 30 mPa·s as a result of heating or cooling. More specifically, the liquid that is discharged by the liquid discharge apparatus may be solutions, suspensions, and emulsions including, for example, solvents such as water and organic solvents, colorants such as dyes and pigments, high-performance materials or functional materials such as polymerized compounds, resins, and surfactants, biomaterials such as deoxyribonucleic acid (DNA), amino acids, proteins, and calcium, and edible ingredients such as natural pigments. For example, these several kinds of liquid may be used for ink used for inkjet printing, surface treatment liquid, an electronic element, components or elements of a light-emitting element, liquid used to form resist patterns of an electronic circuit, and material liquid used to form a three-dimensional object.

Some aspects of the above embodiments of the present disclosure that relate to a heating device, an image forming apparatus, and a liquid discharge apparatus are given below.

First Aspect

A heating device includes a heating roller having a plurality of heat sources inside to heat a sheet, and the plurality of heat sources include three or more first heat sources having a same distribution of thermal intensity and a second heat source having a distribution of thermal intensity different from the distribution of thermal intensity of the three or more first heat sources. The second heat source is disposed inside a polygon whose vertices are the three or more first heat sources when viewed from one end of the heating roller in a longitudinal direction of the heating roller.

Second Aspect

In the heating device according to the first aspect of the present disclosure, the second heat source is disposed at a center of gravity of the polygon whose vertices are the three or more first heat sources when viewed from the one end of the heating roller in the longitudinal direction.

Third Aspect

In the heating device according to the first aspect or the second aspect of the present disclosure, the polygon whose vertices are the three or more first heat sources is a regular polygon where the three or more first heat sources are disposed.

Fourth Aspect

A heating device includes a heating roller having a plurality of heat sources inside to heat a sheet, and the plurality of heat sources include a pair of first heat sources having a same distribution of thermal intensity and a second heat source having a distribution of thermal intensity different from the distribution of thermal intensity of the pair of first heat sources. The second heat source is disposed between the pair of first heat sources when viewed from one end of the heating roller in a longitudinal direction of the heating roller.

Fifth Aspect

In the heating device according to any one of the first to fourth aspects of the present disclosure, the heating roller contacts the sheet being conveyed and rotates, or is in sliding contact with the sheet being conveyed and does not rotate.

Sixth Aspect

In the heating device according to any one of the first to fifth aspects of the present disclosure, the multiple first heat sources have a maximum power output equivalent to a maximum power output of the second heat source.

Seventh Aspect

In the heating device according to any one of the first to sixth aspects of the present disclosure, the second heat source has a heating area whose length in the longitudinal direction of the heating roller is shorter than a length of a heating area of the multiple first heat sources.

Eighth Aspect

In the heating device according to any one of the first to seventh aspects of the present disclosure, each one of the multiple first heat sources has a heating area and the second heat source has a heating area, and the heating areas of the plurality of first heat sources are shifted from the heating area of the second heat source and do not overlap with the heating area of the second heat source in the longitudinal direction of the heating roller.

Ninth Aspect

In the heating device according to any one of the first to eighth aspects of the present disclosure, the first heat source has a heating area adjacent to one end of the heating roller in a longitudinal direction of the heating roller, and the second heat source has a heating area adjacent to another end of the heating roller in the longitudinal direction of the heating roller. The heating device according to any one of the first to eighth aspects of the present disclosure further includes a pair of temperature sensors disposed at both ends of the heating roller in the longitudinal direction of the heating roller, and the temperature sensors measure a pair of temperatures of the heating roller at the ends of the heating roller. The multiple first heat sources and the second heat source are controlled based on the pair of temperatures detected by the pair of temperature sensors.

Tenth Aspect

An image forming apparatus includes an image forming device that forms an image on a sheet, and the heating device according to any one of the first to ninth aspects of the present disclosure that heats the sheet.

Eleventh Aspect

A liquid discharge apparatus includes a liquid discharge device to discharge liquid onto a sheet, and the heating device according to any one of the first to ninth aspects of the present disclosure that heats the sheet.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. A heating device comprising a heating roller having a plurality of heat sources inside to heat a sheet, the plurality of heat sources including three or more first heat sources having a same distribution of thermal intensity and a second heat source having a distribution of thermal intensity different from the distribution of the thermal intensity of the three or more first heat sources, the second heat source being disposed inside a polygon whose vertices are the three or more first heat sources when viewed from one end of the heating roller in a longitudinal direction of the heating roller, wherein the first heat sources and the second heat source do not rotate.

2. The heating device according to claim 1, wherein the second heat source is disposed at a center of gravity of the polygon whose vertices are the three or more first heat sources when viewed from the one end of the heating roller in the longitudinal direction of the heating roller.

3. The heating device according to claim 1, wherein the polygon whose vertices are the three or more first heat sources is a regular polygon where the three or more first heat sources are disposed.

4. The heating device according to claim 1, wherein the heating roller contacts the sheet being conveyed and rotates, or is in sliding contact with the sheet being conveyed and does not rotate.

5. The heating device according to claim 1, wherein the three or more first heat sources have a maximum power output equivalent to a maximum power output of the second heat source.

6. The heating device according to claim 1, wherein the second heat source has a heating area whose length in the longitudinal direction of the heating roller is shorter than a length of a heating area of the three or more first heat sources.

7. The heating device according to claim 1, wherein each one of the three or more first heat sources has a heating area and the second heat source has a heating area, and wherein the heating areas of the three or more first heat sources are shifted from the heating area of the second heat source and do not overlap with the heating area of the second heat source in the longitudinal direction of the heating roller.

8. The heating device according to claim 1, further comprising circuitry configured to control the three or more first heat sources and the second heat source; and a pair of temperature sensors disposed at both ends of the heating roller in the longitudinal direction of the heating roller, wherein the pair of temperature sensors measure a pair of temperatures of the heating roller at the ends of the heating roller, wherein the three or more first heat sources have a heating area adjacent to one end of the heating roller in the longitudinal direction of the heating roller, wherein the second heat source has a heating area adjacent to another end of the heating roller in the longitudinal direction of the heating roller, and wherein the circuitry controls the three or more first heat sources and the second heat source based on the pair of temperatures detected by the pair of temperature sensors.

9. A liquid discharge apparatus comprising:

a liquid discharge device to discharge liquid onto a sheet; and the heating device according to claim 1 to heat the sheet.

10. A heating device comprising a heating roller having a plurality of heat sources inside to heat a sheet, the plurality of heat sources including a pair of first heat sources having a same distribution of thermal intensity and a second heat source having a distribution of thermal intensity different from the distribution of the thermal intensity of the pair of first heat sources, the second heat source being disposed between the pair of first heat sources when viewed from one end of the heating roller in a longitudinal direction of the heating roller, wherein the first heat sources and the second heat source do not rotate.

11. The heating device according to claim 10, wherein the heating roller contacts the sheet being conveyed and rotates, or is in sliding contact with the sheet being conveyed and does not rotate.

12. The heating device according to claim 10, wherein the pair of first heat sources have a maximum power output equivalent to a maximum power output of the second heat source.

13. The heating device according to claim 10, wherein the second heat source has a heating area whose length in the longitudinal direction of the heating roller is shorter than a length of a heating area of the pair of first heat sources.

14. The heating device according to claim 10, wherein each one of the pair of first heat sources has a heating area and the second heat source has a heating area, and wherein the heating areas of the pair of first heat sources are shifted from the heating area of the second heat source and do not overlap with the heating area of the second heat source in the longitudinal direction of the heating roller.

15. The heating device according to claim 10, further comprising circuitry configured to control the pair of first heat sources and the second heat source; and a pair of temperature sensors disposed at both ends of the heating roller in the longitudinal direction of the heating roller, wherein the pair of temperature sensors measure a pair of temperatures of the heating roller at the ends of the heating roller, wherein the pair of first heat sources have a heating area adjacent to one end of the heating roller in the longitudinal direction of the heating roller, wherein the second heat source has a heating area adjacent to another end of the heating roller in the longitudinal direction of the heating roller, and wherein the circuitry controls the pair of first heat sources and the second heat source based on the pair of temperatures detected by the pair of temperature sensors.

16. An image forming apparatus comprising:

an image forming device to form an image on a sheet; and a heating device including a heating roller having a plurality of heat sources inside to heat the sheet, the plurality of heat sources including three or more first heat sources having a same distribution of thermal intensity and a second heat source having a distribution of thermal intensity different from the distribution of the thermal intensity of the three or more first heat sources, the second heat source being disposed inside a polygon whose vertices are the three or more first heat sources when viewed from one end of the heating roller in a longitudinal direction of the heating roller, wherein the first heat sources and the second heat source do not rotate.

* * * * *